United States Patent
Bedford

[15] 3,678,352
[45] July 18, 1972

[54] COMPATIBLE PERMANENT MAGNET OR RELUCTANCE BRUSHLESS MOTORS AND CONTROLLED SWITCH CIRCUITS

[72] Inventor: Burnice D. Bedford, Scotia, N.Y.
[73] Assignee: General Electric Company
[22] Filed: Nov. 6, 1970
[21] Appl. No.: 87,484

[52] U.S. Cl. .............................................. 318/138, 318/254
[51] Int. Cl. ....................................................... H02k 29/00
[58] Field of Search .......................... 318/138, 254, 696, 685

[56] References Cited

UNITED STATES PATENTS

| | | | |
|---|---|---|---|
| 3,482,156 | 12/1969 | Porath | 318/138 |
| 3,023,348 | 2/1962 | Cox | 318/138 |
| 3,127,548 | 3/1964 | VanEmden | 318/696 |
| 3,159,777 | 12/1964 | Manteuffel | 318/138 |

Primary Examiner—Gene Z. Rubinson
Attorney—Paul A. Frank, John F. Ahern, Julius J. Zaskalicky, Donald R. Campbell, Frank L. Neuhauser, Oscar B. Waddell and Joseph B. Forman

[57] ABSTRACT

Brushless motors have physical and electrical characteristics to be compatible with energization by the simple square or stepped wave voltages easily produced with inverter type motor control circuits having a small number of controlled switches responsive to a rotor position sensor. These motors employ a few pairs of opposing non-distributed stator windings arranged overlapping or non-overlapping with a predetermined winding pitch, and a constant gap magnetically polarized or non-polarized rotor with pole faces having related angular dimensions, to thereby produce rectilinear back emf voltages with approximately the same wave shape as the energizing voltages. The circuits can control the applied voltage to adjust motor speed.

9 Claims, 12 Drawing Figures

Inventor
Burnice D. Bedford
by Donald R. Campbell
His Attorney

Inventor
Burnice D. Bedford
by Donald R. Campbell
His Attorney

Inventor
Burnice D. Bedford
by Donald R. Campbell
His Attorney

PATENTED JUL 18 1972

Inventor
Burnice D. Bedford
by Ronald R. Campbell
His Attorney

Fig. 5.

Inventor
Burnice D. Bedford
by Donald R. Campbell
His Attorney

COMPATIBLE PERMANENT MAGNET OR RELUCTANCE BRUSHLESS MOTORS AND CONTROLLED SWITCH CIRCUITS

This invention relates to brushless permanent magnet and reluctance electric motors, and more particularly to brushless motors designed for efficient operation by motor control circuits using a few controlled switches that produce simple square or stepped voltage wave shapes. These brushless motors are specially designed to have similar back emf voltages and are suitable for adjustable speed operation.

Conventional motors are constructed to be operated by sine wave voltages. Motors traditionally classed as alternating current motors are designed to produce sine wave back electromotive force voltages since, as is well known, a motor operates most efficiently when the wave shape of the back emf and energizing voltage are approximately the same to thereby avoid high circulating currents and consequent losses. To this end, ordinary motors such as the a-c induction motor use distributed stator windings to approximate a sine wave and use stator poles that are rounded outwardly at either end of the pole face to attain the same objective. It is also common to use stator slots that are skewed with respect to the axis to cause a rounding of the generated emf. At the present time the attempt is frequently made to use a stepped wave inverter to energize such a conventional motor. Although it is possible to select an inverter with a large number of controlled switches that produce a great number of steps to approximate a sine wave, less expensive inverters generate fewer step changes that deviate substantially from a sine wave. The less complex square or stepped wave inverters thus do not make a good combination with an a-c induction motor.

The permanent magnet and reluctance motors which form the subject of the invention have similarities to motors known in the art as brushless or commutatorless direct current motors. In the brushless d-c motor, the drive coils carrying the magnetizing current which result in the production of torque are located on the stator housing rather than on the movable rotor as in the conventional direct current motor. The rotor is commonly a permanent magnet rotor, and the circuit energizing the drive coils uses controlled switches to control the application of voltage to the stator windings in a sequence to produce continuous rotation of the rotor. As a result, the commutators and brushes utilized on the conventional motor to supply current to the armature windings is eliminated together with such undesirable features as the need to replace brushes, arcing between commutator segments, and repair of worn commutator segments. In order to reduce the cost of the control circuit, and thus minimize the cost of the combination of brushless motor and control circuit, it is desirable to employ a simple control circuit using a small number of controlled switches to produce simple square or stepped voltage wave shapes. Although brushless motors operated by motor control circuits comprising only a few controlled switches have appeared in the prior art, there is inadequate recognition in the prior art of the need to match the physical and electrical parameters of the motor to the particular rectilinear energizing voltage that can be easily produced by a simple control circuit.

The compatible brushless motors and motor control circuits described in this application employ, as illustrative embodiments of the invention, motor control circuits with four to six controlled switches for producing simple square and stepped voltage wave shapes, together with appropriate designs of permanent magnet or reluctance brushless motors that generate a similar back emf wave shape, whereby efficient motor operation is obtained. As a continuation of the general subject matter, another concurrently filed application by the same inventor assigned to the same assignee, Docket Ser. No. 87,565, filed Nov. 6 1970, discloses and claims other brushless reluctance motors suitable to be energized by even simpler control circuits having as few as two or three controlled switches, wherein efficient operation is possible because reluctance motors have no characteristic back emf and can operate on a variety of wave shapes.

Accordingly, an object of the invention is the improved combination of a brushless or commutatorless electric motor and a motor control circuit employing only a few controlled switches to produce simple square or stepped voltage wave shapes, wherein the brushless motor is designed to have the same back emf wave shape and operate efficiently on the voltage and current wave shapes produced by the particular control circuit.

Another object is the provision of a family of new and improved permanent magnet or reluctance brushless motors constructed to be compatible with the simple rectilinear voltage wave shapes easily produced by motor control circuits comprising a small number of controlled switches.

Yet another object is to provide the combination of an inexpensive, efficient permanent magnet brushless motor and inverter type control circuit that is suitable for adjustable speed operation.

A further object is the provision of new and improved permanent magnet and reluctance brushless motors designed to be operated by the simple rectilinear wave shapes easily produced by simple inverter control circuits.

In accordance with the invention, a compatible brushless motor and motor control circuit includes an annular stator member supporting a plurality of opposing pairs of concentrated (non-distributed) stator windings for generating magnetic fields of opposite polarity in torque producing relation to a rotatable ferromagnetic polarized or non-polarized rotor. The stator member and rotor each have opposing arcuate pole faces establishing an approximately constant gap width therebetween. The motor control circuit comprises only a few controlled switches, preferably only one alternately conducting pair of solid state switches for each pair of stator windings, for applying simple substantially rectilinear wave shape energizing voltages to the pairs of stator windings. The winding pitch and location relative to one another of the concentrated stator windings, and circumferential length of the rotor pole faces, have interdependent angular dimensions to produce rectilinear back emf voltages in each pair of stator windings that have approximately the same wave shape as the applied energizing voltages. Control means responsive to the instantaneous rotor position renders the controlled switches conductive for desired intervals to energize the pairs of stator windings in a sequence to produce continuous torque to rotate the rotor in a given direction.

The invention is also directed to the brushless motor per se. In various forms of the invention, there are two or three pairs of overlapping and non-overlapping concentrated stator windings with a winding pitch of about 90°, 60°, and 120°, and the rotor pole faces selectively have one of these angular dimensions.

The foregoing and other objects, features, and advantages of the invention will be apparent from the following more particular description of several preferred embodiments of the invention, as illustrated in the accompanying drawings wherein:

The compatible brushless motor designs and motor control circuits to be described are suitable for manufacture in the small to medium horsepower range. These motors are preferably made with permanent magnet rotors, shaped to create a constant air gap at the interface with the stator pole faces, but can also be made with reluctance type soft iron rotors having a similar shape. In some applications, the higher manufacturing cost of the permanent magnet motor is justified to save weight and power.

Figure 1A:
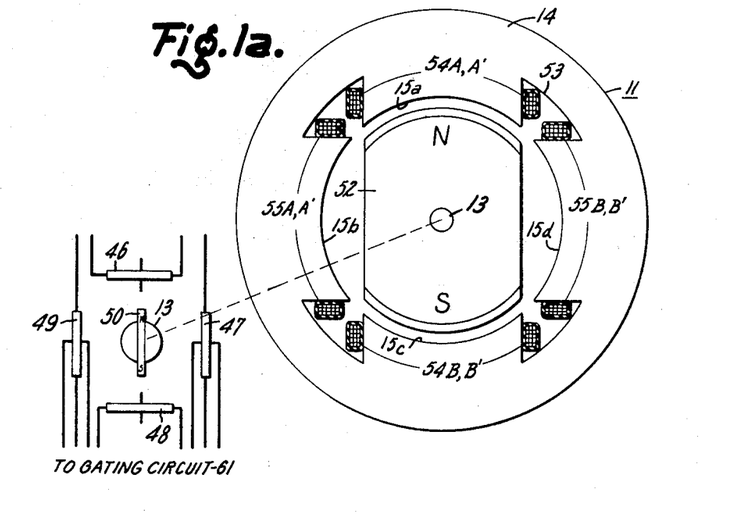
FIG. 1a shows a diagrammatic end view of a permanent magnet brushless motor constructed in accordance with the invention with four 90° stator poles and concentrated stator windings, and two 90° rotor poles.

FIG. 1a shows a permanent magnet motor in a size suitable for operation from a battery source by a motor control circuit that uses four controlled switches for producing a two phase square voltage wave shape. The motor comprises in general an annular stator member 11 including a frame member 14 within which a permanent magnet rotor 52 rotates on a shaft 13. The permanent magnet rotor 52 has diametrically opposite 90° arcuate pole faces and two parallel sides, and preferably has laminated pole tips to prevent hysteresis and eddy current loss due to variations of the flux at the pole surfaces. The stator frame member 14 is provided with four equally spaced winding slots 53 shaped to have small openings to provide a good flux path for the rotor flux and to define stator segments or pole faces 15a–15d that have an almost 90° circumferential length. It will be noted that the entire length of each stator segment is arcuate, i.e., the ends are not rounded outwardly toward the outside of the motor. Two opposing pairs of stator windings are supported on the stator frame 14 within the slots 53, each with a 90° winding pitch.

Figures 1B, 1C:
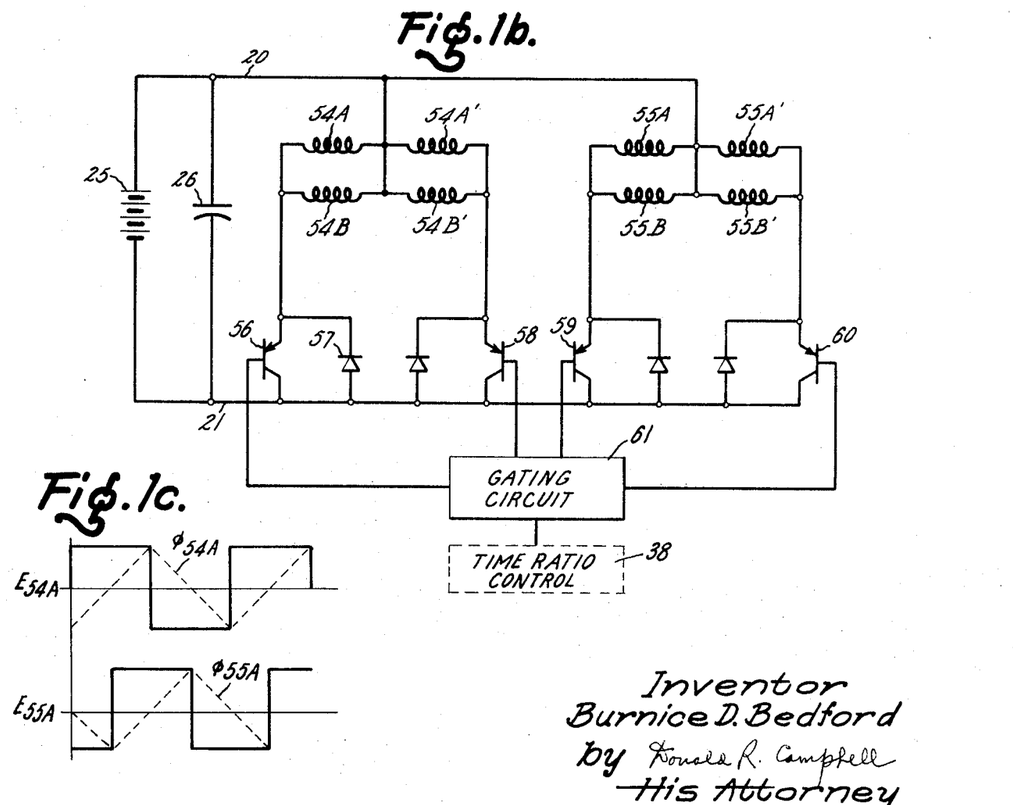
FIG. 1b is a schematic circuit diagram of a motor control circuit employing four controlled solid state switches that is compatible with the FIG. 1a motor.
FIG. 1c is a waveform diagram of the two phase square voltage waveforms produced by the motor control circuit of FIG. 1b, further showing in dotted lines the average magnetic flux characteristics produced by these applied voltages.

Referring to the motor control circuit shown in FIG. 1b, stator windings 54A and 54A' are essentially a single winding wound in two adjacent stator slots, while windings 54B and 54B' are wound effectively as a single winding in the opposing stator slots. Electrically, the center tap junctions between windings 54A and 54A' and between windings 54B and 54B', are connected together and to positive supply terminal 20. The other free ends of the respective pairs of windings so formed are coupled to negative supply terminal 21 respectively through transistor switch 56 and inverse parallel connected diode 57, and through transistor switch 58 and its associated feedback diode. Supply terminals 20 and 21 are connected across a battery 25 and parallel filter capacitor 26. Since windings 54A and 54B conduct current in only one direction, they are wound oppositely to produce opposite magnetic poles, and the same is true of windings 54A' and 54B'. The other pairs of the opposing windings 55A and 55A', and 55B and 55B', are displaced mechanically by 90°, but are otherwise identically arranged and connected with the use of the third and fourth transistors 59 and 60 and their respective inverse-parallel feedback diodes.

Gating circuit 61 for the four transistors is under the control of a mechanical, magnetic, or optical rotor position sensor, to initiate switching of the transistor switches as the motor rotates in dependence upon the instantaneous position of rotor 52. Specific gating circuits that can be used are given, for example, in the Transistor Manual, 7th Edition, copyright 1964, published by the General Electric Company and available from the Semiconductor Products Department, Electronics Park, Syracuse, New York. The rotor position sensor illustrated in FIG. 1a comprises a plurality of magnetic sensors in the form of Hall elements or generators 46–49 assembled at 90° intervals about an extension of the motor shaft 13 and actuated by a permanent magnet 50 secured for rotation with shaft 13. Sensors of this type which operate on the Hall effect principle generate an output voltage between the two output terminals when a magnetic field is applied perpendicular to the face of the Hall element and an energizing control current is applied between the two input terminals, which are usually aligned with the longitudinal axis of the element. Further information on the Hall generator itself and its utility as a rotor position sensor in a brushless motor can be obtained from the prior art patents, as for example, U.S. Pat. No. 3,159,777 to E.W. Manteuffel, granted Dec. 1, 1964, and assigned to the General Electric Company. As has been indicated, a mechanical cam or an optical sensor, as is known in the art, can also be used to sense the instantaneous position of permanent magnet rotor 52 whereby gating circuit 61 provides gating signals for transistors 56, 58, 59, and 60 that are timed in dependence upon the rotor position. This direct control of the time of switching of the control switches makes the motor function much as a d-c motor with no synchronizing problems.

The permanent magnet motor of FIG. 1a is symmetrical and is operable in both directions. The compatible motor control circuit of FIG. 1b is controlled to apply to the opposing pairs of stator windings the two phase square wave voltage wave shapes illustrated in FIG. 1c for windings 54A and 55A, the wave shapes for the other pair of opposed windings being similar. The voltage wave shapes and average magnetic flux characteristics, shown in dotted lines, are idealized, and the discussion of the motor to follow assumes idealized parameters and characteristics. The motor air gap and control circuit switching times may depart slightly from the idealized situation to compensate for leakage flux and flux shift due to motor torque. The same remarks apply to FIGS. 2a–5. Each stator winding and its associated stator pole acts like a simple solenoid in that the magnetic flux characteristic produced by the application of a constant unidirectional voltage is linear. The magnetic flux characteristics $\phi_{54A}$ and $\phi_{55A}$ generated respectively by the application of square wave voltages $E_{54A}$ and $E_{55A}$ increase and decrease linearly in the manner shown in FIG. 1c. Switching of the transistors in the control circuit to change the polarity of the applied voltage is timed such that the rotor 52 is centered on a particular stator pole when the flux in that stator pole is at a maximum. Accordingly, transistors 56 and 58 change state almost simultaneously, i.e., the conducting one is turned off and the non-conducting one is turned on, when rotor 52 is centered and stator poles 15a and 15c. In like manner, transistors 59 and 60 are operated as a complementary pair and change state when rotor 52 is centered on the other two stator poles 15b and 15d.

In a typical sequence of operations for counter-clockwise rotation, transistor 56 is turned on to establish current flow through stator windings 54A and 54B when a reference end of the rotor (the S pole) is centered on stator pole 15c. Looking only at the state of the flux in stator pole 15a, it is seen that the average flux is driven from its maximum negative value and crosses the zero ordinate just at the time that the leading edge of permanent magnet rotor 52 reaches the near end of stator pole 15a, adjacent to stator pole 15d. During the next one-quarter of revolution when the arcuate pole face of rotor 52 is moving into alignment with stator pole 15a, the average magnetic flux in this stator pole increases from about zero to its maximum. At this time the state of transistors 56 and 58 is changed, and transistor 58 is now conductive and energizes windings 54A' and 54B'. During the succeeding one-quarter of revolution of rotor 52, the average flux in stator pole 15a is decreasing linearly from its maximum to zero, and the polarity of the flux changes just as the trailing end of rotor 52 leaves the end of stator pole 15a adjacent to stator pole 15b. The magnetic flux in the orthogonally oriented stator pole 15d is tracing a similar characteristic but delayed by 90° as related to the rotation of the rotor, and so on for the other stator poles. Thus, continuous torque is exerted upon rotor 52.

When the FIG. 1a motor is used as a permanent magnet motor, the rotor flux is relatively constant and the motor tends to have the voltage-speed characteristics of a d-c shunt motor. If the permanent magnet rotor is replaced by a reluctance rotor, the motor runs as a variable reluctance motor and has the voltage-speed characteristics that tend to be more like those of series d-c motors. Magnetic saturation may be used to limit the flux and obtain a characteristic which is a compromise between that of a series and a shunt motor. Either the series or shunt motor characteristic is suitable for speed control by controlling the d-c voltage. To vary the d-c supply voltage, and thus change the speed of the motor, it is possible to use a time ratio voltage control circuit ahead of the motor to change supply voltage for the motor windings, or a single phase alternating current source can be used in conjunction with a phase controlled rectifier. The motor switching circuit of FIG. 1b, however, is well suited to include time ratio voltage control. To do this, a transistor switch that is conducting is turned on and off rapidly at a fast rate compared to the motor speed to control the average motor voltage and motor current. The associated feedback diode 57 is conductive during the short period when the transistor is turned off to achieve time ratio control. Thus, gating circuit 61 is optionally under the control of time ratio control circuit 38. The reduction of the voltage applied to the pairs of stator windings, as is well known, depends upon the ratio of the time it is conducting to the time it is non-conducting as it is being turned on and off rapidly.

The permanent magnet or reluctance motor and motor control circuit are compatible because the brushless motor constructed as shown in FIG. 1a generates approximately the same back emf voltage wave shape as is applied to the pairs of stator windings by the motor control circuit of FIG. 1d. This assumes that there is constant air gap between the rotor pole faces and the stator pole faces. To illustrate this, the back emf voltage wave shape generated in stator winding 54A will be traced (assuming an ideal motor) during one-half revolution of rotor 52. Looking only at one end of the rotor, as for instance, the north pole, the average magnetic flux generated in stator pole 15a increases linearly from zero to a maximum and then back to zero as rotor 52 rotates 90° clockwise from out of alignment into complete alignment with stator pole 15a, and then another 90° from complete alignment to out of alignment in the other direction. At this time the south pole of rotor 52 is beginning to move into alignment with stator pole 15a, and during the next one-half revolution the magnetic flux decreases linearly from zero to a minimum in the other direction and back to zero. Consequently, the back emf voltage generated in stator winding 54A has the same square voltage wave shape as that for the energizing voltage shown in FIG. 1c, and the phasing is the same. Of course, a suitable technique is used to assure that the motor has running current, such as by making the magnitude of the applied voltage greater than the back emf voltage and the IR drop involved in circulating current through the stator windings. Also, the switching times of the switches with respect to rotor position may be advanced to compensate for leakage reactance, or some departure from the idealized air gap may be made to compensate for leakage flux and flux shift due to load current or flux shift due to motor torque. To be compatible with two phase square wave voltage energization of the motor, and to avoid the excessive circulating currents and losses that are incurred when the back emf voltage wave shape is not the same as the applied voltage wave shape, it is seen that the FIG. 1a motor is constructed with non-overlapping approximately 90° concentrated stator windings, and a rotor with arcuate pole faces that have an effective circumferential length of about 90° also. The brushless motor constructed in this manner operates efficiently on applied voltages with a two phase square wave shape.

Figure 2A:
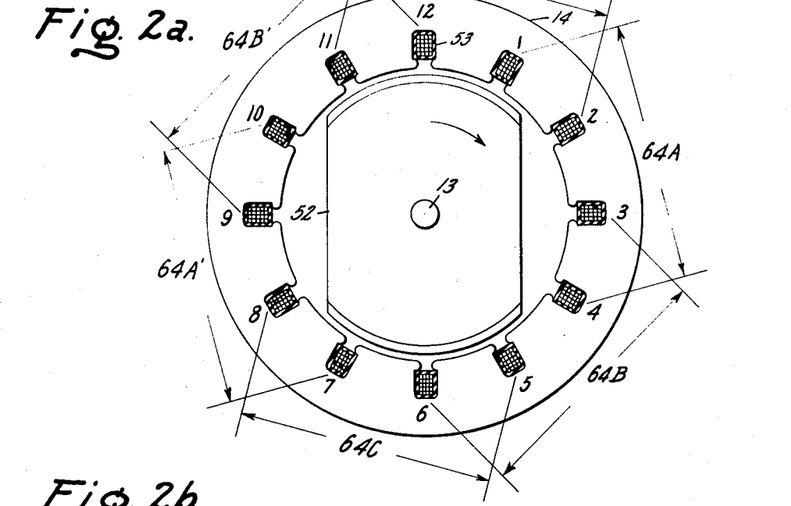
FIG. 2a illustrates a second embodiment of a permanent magnet brushless motor having six overlapping 90° concentrated stator windings, and 90° rotor poles.

The second embodiment of the invention shown in FIG. 2a also uses a 90° permanent magnet rotor, however there are now six overlapping 90° concentrated stator windings, and different combinations of 30° stator segments forming 90° stator poles. The combinations of stator segments, it is understood, become a pole under the influence of winding magnetomotive force and in dependence on the position of the rotor. This brushless motor is energized by what can be referred to as three phase square voltage wave shapes, and this motor design produces a similar back emf wave shape. The three pairs of opposing 90° concentrated stator windings are identified as windings 64A and 64A', 64B and 64B', 64C and 64C'. A total of 12 stator slots 53 are located about the inner periphery of stator member 14, defining 12 equal stator segments, and each winding disposed in the stator slots overlaps the two adjacent windings by 30°. The three phase square voltage wave shapes required for efficient operation of the motor of FIG. 2a are shown in FIG. 2c, and can be produced by what can loosely be called a three-phase version of the FIG. 1b control circuit. Another compatible motor circuit for producing this type of voltage wave shape is the motor control circuit of FIG. 2b, which is energized by a three phase alternating current source, uses a phase controlled rectifier for input voltage control, and employs six silicon controlled rectifiers as the power switching devices arranged as a conventional three phase inverter circuit.

Figure 2B:
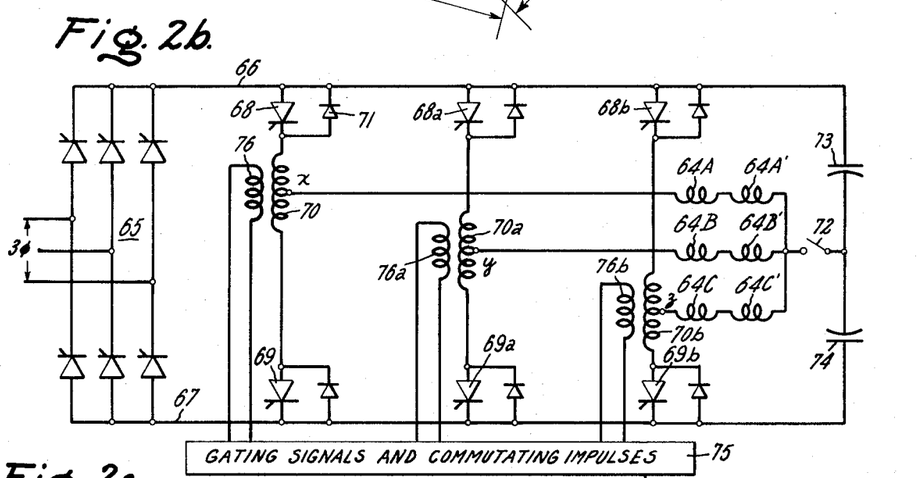
FIGS. 2b and 2c show respectively a motor control circuit comprising six SCRs arranged in the form of a conventional full wave, three phase inverter circuit with the addition of a neutral switch which when closed and operated to generate the square wave voltage wave shapes and resultant magnetic flux curves shown in FIG. 2c is suitable to energize the FIG. 2a motor.
Figure 2C:
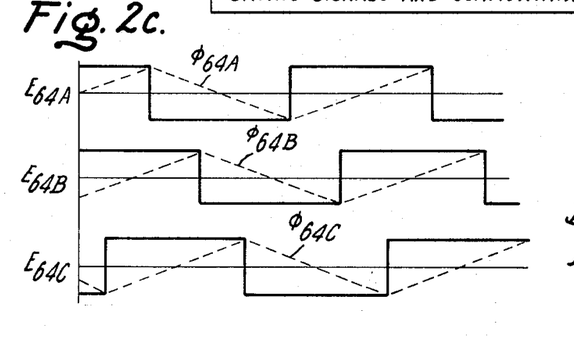

Referring to FIG. 2b, the input terminals of the motor control circuit are connected to a conventional full wave, phase controlled rectifier 65 comprising six SCR's. As is well known, varying the phase of which the SCR's are rendered conductive adjusts the magnitude of the d-c voltage produced at output terminals 66 and 67. The motor control circuit proper is a full wave, three phase inverter circuit. The first phase comprises two SCR's 68 and 69 connected in series with a current limiting and commutating winding 70, and further includes a feedback diode 71 for reactive current connected in inverse-parallel relationship across the load terminals of each thyristor. The center tap point $x$ of commutating winding 70 is coupled directly to series connected stator windings 64A and 64A', which are optionally connected through a neutral switch 72 to the junction between two series connected voltage divider capacitors 73 and 74. The other two phases of the inverter circuit have an identical arrangement of components designated by the same numeral with an "$a$" or "$b$" suffix. The three pairs of opposing stator windings are wye-connected to one terminal of neutral switch 72, and to respective commutating winding center tap points $x$, $y$, and $z$ in the three phases of the inverter circuit.

The silicon controlled rectifier is a triode reverse blocking thyristor that is rendered conductive when the anode is positive with respect to the cathode and when a gating signal is applied to the gate electrode. Thereafter the gate electrode loses control over conduction through the device and to commutate it off or render it non-conductive it is necessary to apply a reverse bias voltage or to reduce the flow of current through the device below the holding value for a determined time before reapplying forward voltage. Gating signals and commutating impulses for the thyristors are generated in a circuit 75 under the control of a mechanical, magnetic, or optical rotor position sensor 37 of the type previously discussed with regard to FIG. 1a. Suitable gating circuits that can be used are given in the Silicon Controlled Rectifier Manual, 4th Edition, copyright 1967, published by the General Electric Company, and available from the address previously given. The commutating impulses are coupled respectively to commutating windings 70, 70a, and 70b by closely coupled windings 76, 76a, and 76b. The commutating pulses generate reverse currents that oppose the flow of load current through a conducting SCR to commutate it off. In order to produce the square voltage wave shapes shown in FIG. 2c, it is necessary to close neutral switch 72. The operation of this type of inverter circuit, which operates on simple square wave gating signals, is well known as described for example in the book, "Principles of Inverter Circuits" by Bedford and Hoft, John Wiley and Sons, Inc., New York, Library of Congress catalog card No. 64-20078, copyright 1964. Briefly, supplying a gating signal from circuit 75 to the gate electrode of SCR 68 to render it conductive applies a positive polarity square wave voltage to windings 64A and 64A', which are wound in opposite directions to produce opposite magnetic poles. Upon commutating off SCR 68 and turning on SCR 69, the polarity of the voltage applied to windings 64A and 64A' is reversed, thereby reversing the polarity of the stator magnetic poles produced when the flow of current through the windings changes direction. The other thyristors in the other phases of the inverter are operated similarly at the proper intervals to produce the 60° phase displaced square voltage wave shapes shown in FIG. 2c. Only voltage waveforms $E_{64A}$, $E_{64B}$, and $E_{64C}$ representing the voltages applied to those windings are illustrated, the others being complementary.

Each opposing pair of stator windings is alternately energized with positive polarity voltage and negative polarity voltage at 180° intervals of rotation of permanent magnet rotor 52. The timing of application of voltage is the same as described with regard to FIGS. 1a–1c, that is, the change from one polarity to the other is made when an adjacent rotor pole is approximately centered on a particular concentrated winding and the stator pole defined by that winding. As is also the case with FIG. 1c, the flux at the instant at that particular stator pole is approximately at a maximum. As will be observed in FIG. 2c, where the average magnetic flux characteristics $\phi_{64A}$, $\phi_{64B}$, and $\phi_{64C}$ are illustrated, the magnetic flux in any particular pole increases and decreases linearly. The motor shown in FIG. 2a is, loosely speaking, a three-phase version of the two phase motor of FIG. 1a, and operates in a similar manner. The only difference is that the stator windings overlap by 30° on each side, and consequently, the total average magnetic flux in these overlapping stator pole regions is the sum of the flux produced by each stator winding operating individually. The flux due to the overlapping windings is of the same polarity during most of the time that any portion of the rotor is adjacent that stator pole portion, and thus is beneficial since it tends to smooth the torque. For example, the flux in the stator segment between stator slots 1 and 2 is the sum of that due to stator winding 64A and stator winding 64C'. At the time the flux in this stator segment produced by winding 64A is going through zero toward its maximum (the leading end of rotor 52 is adjacent stator slot No. 1), the flux generated by stator winding 64C' is increasing toward the same polarity maximum and does not begin to decrease until the leading end of rotor 52 is adjacent stator slot No. 2. The overlapping stator winding, therefore, is beneficial to the production of continuous torque.

The motor constructed as illustrated in FIG. 2a is compatible with the motor control circuit of FIG. 2b when connected and controlled to produce the voltage wave shapes shown in FIG. 2c because the motor operates efficiently with these applied voltage wave shapes, as has already been explained, while at the same time the back emf generated in the stator windings have the same wave shape. In the same manner as has been discussed with regard to FIGS. 1a–1c, the rotor flux acting on each opposing pair of concentrated stator windings increases linearly to a maximum and then decreases linearly to the same level as the rotor poles rotate 180° from out of alignment into complete alignment, and then from complete alignment to out of alignment in the other direction. This induces a square voltage wave shape or square back emf in each stator winding pair. Since the pairs of stator coils are physically displaced by 60°, the resulting back emf's are also phase displaced by 60° as related to the rotation of the motor, and this corresponds to the three phase square wave voltage energization of the stator windings illustrated in FIG. 2c. Adjustable speed operation of this motor and of the other motors to be described hereafter that are operated by the FIG. 2b control circuit is obtained, as previously mentioned, by control of the d-c supply voltage by the phase controlled rectifier. The voltage impressed on the stator windings is also changed by time ratio control operation of the thyristor switches. Moreover, the SCR's in this control circuit can be replaced by other suitable solid-state switches such as the transistor, diac, triac, etc.

Figure 3A:
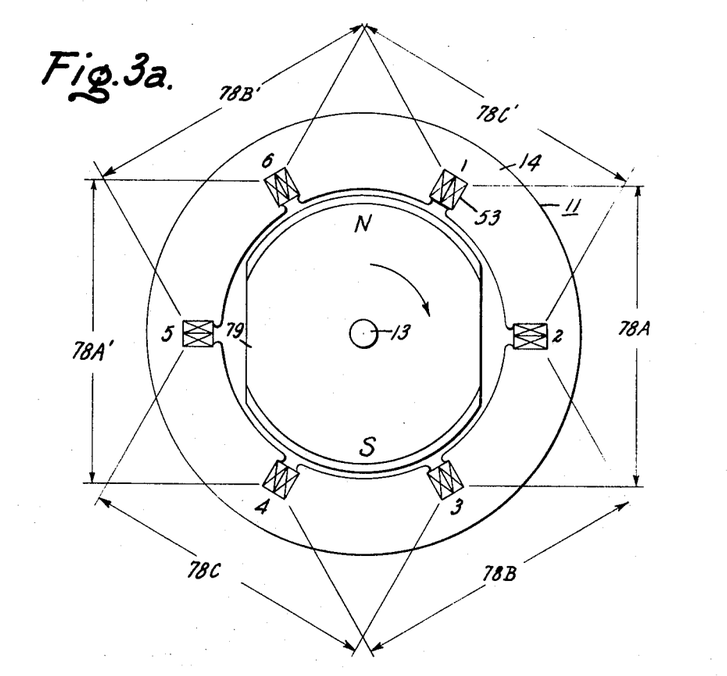
FIGS. 3a and 3b illustrates respectively another embodiment of the permanent magnet brushless motor with six overlapping 120° concentrated windings and a 120° rotor that is energized by the control circuit of FIG. 2b, the neutral switch assumed to be open, in a manner to produce the three phase stepped voltage wave shapes and resulting average magnetic flux characteristics shown in FIG. 3b.
Figure 3B:
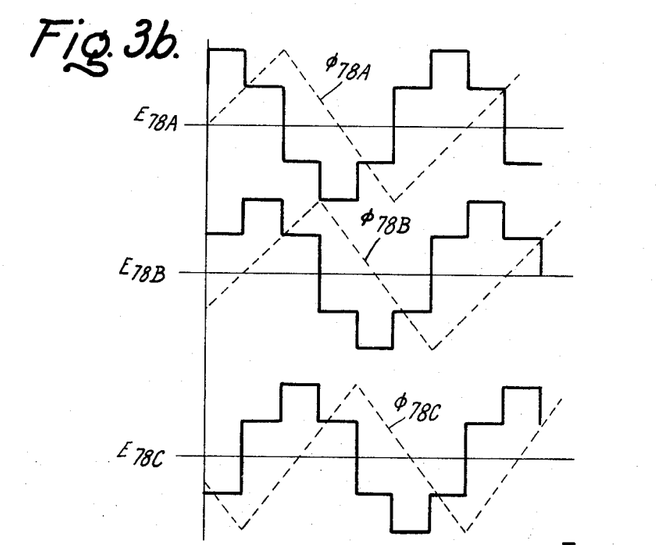

The conventional three phase stepped wave voltage wave shapes shown in FIG. 3b are obtained when the neutral switch in the motor control circuit of FIG. 2b is opened and the inverter is operated according to the widely used mode of operation as described for instance in the aforementioned Bedford and Hoft book. In FIG. 2b, it is assumed that windings 78A and 78A' replace windings 64A and 64A', and so on. The compatible motor design for use with these voltage wave shapes is illustrated in FIG. 3a. The three pairs of opposing concentrated 120° stator windings 78A and 78A', 78B and 78B', and 78C and 78C', are located so as to overlap each adjacent winding by 60°. To this end there are six of the stator slots 53, equally spaced from one another, defining six equal stator segments. The permanent magnet rotor 79 has 120° arcuate rotor pole faces.

The three phase stepped voltage wave shapes $E_{78A}$, $E_{78B}$, and $E_{78C}$, illustrated in FIG. 3b, are phase displaced by 60° as related to the revolution of the motor. The corresponding magnetic flux characteristics $\phi_{78A}$, $\phi_{78B}$, and $\phi_{78C}$ produced by these energizing voltages are also shown in dashed lines in FIG. 3b. The application of voltage to a particular stator winding is timed so that the change from positive to negative polarity of applied voltage occurs when the flux produced by that stator winding is at a maximum and the rotor is centered on that particular winding or completely aligned with it. Subsequent step changes in the applied voltage are made at 60° intervals as related to the revolution of the motor. With the use of a 120° rotor and a 120° concentrated stator winding, there may be some negative torque exercised on the rotor during one-quarter of the time that any portion of a rotor pole face is opposite any portion of the corresponding stator pole face. This is because the rotor takes 120° to rotate into alignment with the stator pole, and 120° to rotate out of alignment, making a total of 240°, whereas the magnetic flux in any particular stator winding is changing at 180° intervals. During a 60° interval, then, negative torque may be exerted on the rotor, depending on such factors as the leakage reactance, etc., as is known in the art. However, some negative torque is not detrimental to good operation of the motor. In the manner already explained with regard to FIG. 2a, the use of overlapping stator windings in general is beneficial because of the smoother torque produced.

The back emf wave shape produced by a permanent magnet or reluctance motor constructed as shown in FIG. 3a is the same as the applied step voltage wave shapes, and hence the motor and control circuit are compatible. During any single 180° interval of travel of the rotor past a particular concentrated stator winding, such as winding 78A, and in view of the 120° circumferential length of the rotor pole faces, there is a period when one rotor pole is acting on the stator winding, a period when both rotor poles are acting on the stator winding, and a period when the other rotor pole is acting on the stator winding solely. Assuming that the leading edge of the north pole of rotor 52 is commencing to rotate clockwise into alignment with concentrated winding 78A, the aligned rotor poles at 60° intervas are: S 60°, N 60°, N 120°, N 60°, and S 60°. This plots out a magnetic flux characteristic acting on concentrated stator winding 78A that is identical to the curve $\phi_{78A}$ in FIG. 3b. The resulting induced back emf has the same wave shape as applied voltage $E_{78A}$.

Figure 4A:
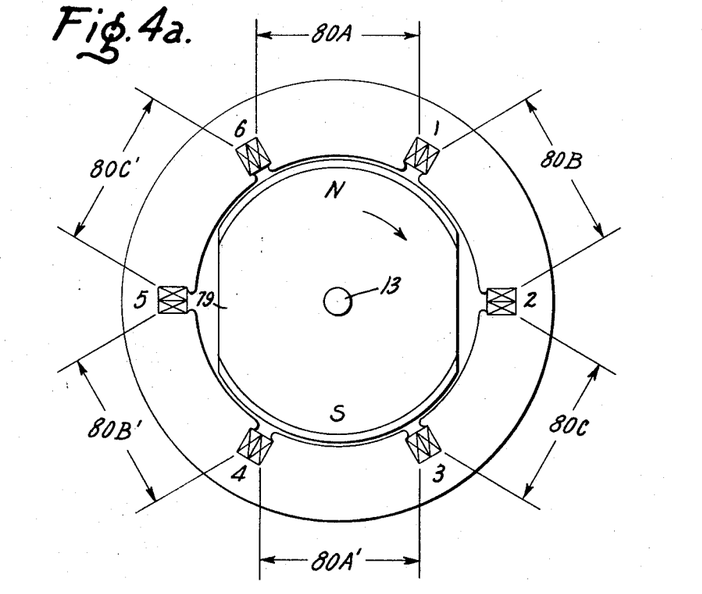
FIG. 4a is still another embodiment of a permanent magnet brushless motor characterized by six 60° non-overlapping concentrated windings and a 120° rotor.
Figure 4B:
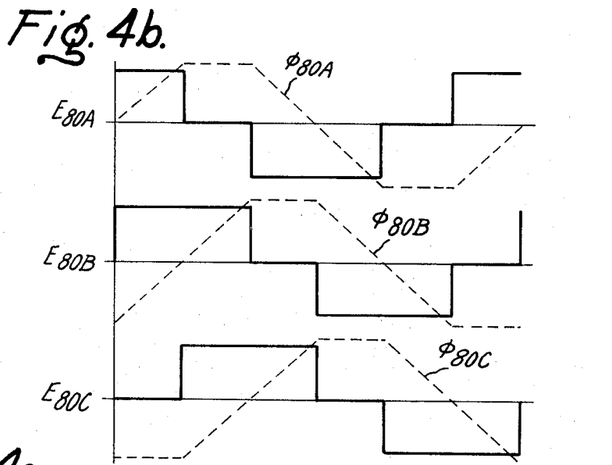
FIGS. 4b and 4c show respectively the quasi-square voltage wave shapes supplied to three adjacent stator windings of the FIG. 4a motor by the motor control circuit of FIG. 2b when modified to have delta-connected pairs of stator windings as illustrated in FIG. 4c.
Figure 4C:
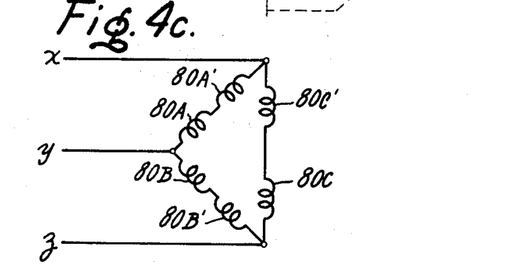
Figure 5:
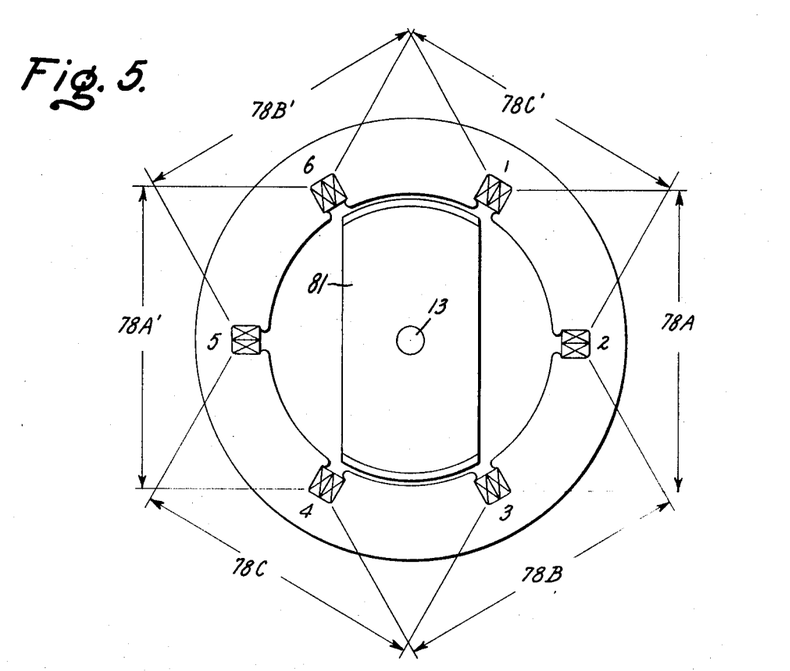
FIG. 5 is a modified form of the motor shown in FIG. 4a having six overlapping 120° windings and a 120° reluctance rotor, that is suitable for energization by the same voltage wave shapes as illustrated in FIG. 4b.

The permanent magnet motor designs illustrated in FIG. 4a and FIG. 5a are both compatible for energization by the voltage wave shapes shown in FIG. 4b. These quasisquare voltage wave shapes are produced when the motor control circuit of FIG. 2b is operated with the neutral switch open with with the three pairs of stator windings delta-connected as shown in FIG. 4c. To obtain these quasi-square voltage wave shapes, in which the zero voltage intervals are half as long as the positive and negative voltage intervals, the thyristors are supplied with 180° square wave gating signals and are sequentially gated at 60° intervals in the manner further explained on page 267 of the aforementioned Bedford and Hoft book.

The compatible motor design of FIG. 4a uses the 120° permanent magnet rotor 79, but requires three pairs of opposing 60° concentrated stator windings 80A and 80A', 80B and 80B', and 80C and 80C' that are non-overlapping. The three applied voltage wave forms $E_{80A}$, $E_{80B}$, and $E_{80C}$ illustrated in FIG. 4b are phase displaced by 60° as related to the revolution of motor, corresponding to the physical displacement of the opposing pairs of stator windings. As is observed from the magnetic flux characteristics $\phi_{80A}$, $\phi_{80B}$, and $\phi_{80C}$, the flux is driven to a maximum of one polarity by the applied voltage, and remains at this maximum level during the zero voltage interval, and is driven down only by applying a voltage of the opposite polarity. The switching of the thyristors in the motor control circuit occurs at intervals about 30° before and after the center of the rotor pole face is at the center of a particular concentrated winding, since both the flux and the applied voltage are constant during the intervening 60° interval. Efficient operation of the motor is obtained as the magnetic flux in succeeding stator poles in a clockwise or counterclockwise sequence are driven to their constant maximum value at succeeding 60° intervals. No negative torque is produced since the entire 120° permanent magnet rotor 79 requires exactly 180° to rotate past every portion of a 60° stator pole.

The back emf voltages produced by the motor of FIG. 4a have the same quasi-square voltage wave shapes as the applied voltages illustrated in FIG. 4b. Going through the analysis for concentrated stator winding 80B, the rotor flux acting on stator winding 80B increases linearly, assuming clockwise rotation, as the leading edge of rotor 79 rotates from stator slot No. 1 to stator slot No. 2. For the next 60° rotation, the rotor flux is constant, while for the remaining 60° of rotation, the flux is decreasing linearly back towards zero. This is the same characteristic as the flux characteristics shown in FIG. 4b, and the induced back emf generated in stator winding 80B has the same wave shape as the applied voltage wave shape.

The motor design of FIG. 5 is also compatible with the FIG. 2b motor control circuit when operated to produce the quasi-square voltage wave shapes given in FIG. 4b. In place of the 120° permanent magnet rotor 79, the rotor 81 has a 60° circumferential length and is illustrated as being a soft iron reluctance rotor in place of the permanent magnet rotor. The three pairs of opposing concentrated 120° stator windings are identical to the stator winding arrangement shown in FIG. 3a, and for convenience are given the same identifying numerals. These concentrated 120° stator windings overlap each adjacent winding by 60°. The timing of the applied voltage to a particular stator winding is such that the magnetic flux in that stator pole, taken individually, is midway through its constant maximum magnitude at the time the rotor 81 is centered upon that particular stator winding. No negative torque is exerted upon rotor 81, and the resultant flux pattern produced by the overlapping pairs of stator windings is beneficial to the production of continuous for the reasons given in the discussion of FIG. 3a. The back emf generated by the FIG. 5 motor in any one stator winding is the same as the applied voltage wave shapes. As rotor 81 rotates past stator winding 78A, for example, the flux acting on stator winding 78A to produce an induced back emf increases to a maximum as the stator rotates 60°, is constant for the next 60°, and then decreases linearly for the final 60° of rotation. Consequently, the motor of FIG. 5 and the motor control circuit of FIG. 2b, operated to produce the applied voltage wave shapes shown in FIG. 4b, are compatible.

In summary, a family of permanent magnet or reluctance brushless motors are designed to have a simple approximately square or stepped wave shape back emf characteristic that matches the applied voltage wave shapes easily produced by a motor control switching circuit comprising a number of controlled switches. The switching circuits disclosed are known inverter-type circuits using solid state switches that can if desired be controlled by time ratio control principles to vary the voltage impressed on the motor windings to adjust the speed of the motor. The brushless motors comprise an annular stator with opposing pairs of concentrated (non-distributed) stator windings wound with a predetermined winding pitch in non-overlapping or overlapping relationship. The permanent magnet or reluctance rotors have opposing arcuate poles, to define a constant or an approximately constant width gap between the rotor and stator poles faces, and a specified circumferential length. The motors are simple, but operate with good efficiency on rectilinear or substantially rectilinear wave shapes, as compared to conventional alternating current motors that have design features adapting them for sine wave energization.

While the invention has been particularly shown and described with reference to several preferred embodiments thereof, it will be understood by those skilled in the art that the foregoing and other changes may be made therein without departing from the spirit and scope of the invention.

What I claim as new and desire to secure by Letters Patent of the United States is:

1. A compatible brushless motor and motor control circuit comprising an annular stator member supporting a plurality of opposing pairs of concentrated stator windings for generating magnetic fields of opposite polarity in torque producing relation to a rotatable ferromagnetic rotor, said stator member and rotor each having opposing arcuate pole faces to establish an approximately constant gap width therebetween, a motor control circuit comprising only a few controlled switches for applying simple substantially rectilinear wave shape energizing voltages of both polarities to said pairs of stator windings, the winding pitch and location relative to one another of said concentrated stator windings, and the circumferential length of said rotor pole faces, having interdependent angular dimensions to produce substantially rectilinear back emf voltages in each pair of stator windings that have approximately the same wave shape as the energizing voltage applied by said motor control circuit, and control means responsive to the instantaneous position of said rotor for rendering conductive said controlled switches for desired intervals of conduction to energize said pairs of stator windings in a sequence to produce continuous torque to rotate said rotor in a given direction, wherein there are only three opposing pairs of series connected concentrated stator windings, said motor control circuit comprises a pair of alternately conducting controlled switches for each pair of stator windings, said controlled switches being solid state controlled devices, said three opposing pairs of concentrated stator windings each having a winding pitch of about 90° and each stator winding overlaps the adjacent stator windings by about 30°, and said rotor pole faces have a circumferential length of about 90°, whereby the brushless motor is suitable for square voltage wave shape energization.

2. A compatible brushless motor and motor control circuit comprising an annular stator member supporting a plurality of opposing pairs of concentrated stator windings for generating magnetic fields of opposite polarity in torque producing relation to a rotatable ferromagnetic rotor, said stator member and rotor each having opposing arcuate pole faces to establish an approximately constant gap width therebetween, a motor control circuit comprising only a few controlled switches for applying simple substantially rectilinear wave shape energizing voltages of both polarities to said pairs of stator windings, the winding pitch and location relative to one another of said concentrated stator windings, and the circumferential length of said rotor pole faces, having interdependent angular dimensions to produce substantially rectilinear back emf voltages in each pair of stator windings that have approximately the same wave shape as the energizing voltage applied by said motor control circuit, and control means responsive to the instantaneous position of said rotor for rendering conductive said controlled switches for desired intervals of conduction to energize said pairs of stator windings in a sequence to produce continuous torque to rotate said rotor in a given direction, wherein there are only three opposing pairs of series connected concentrated stator windings, said motor control circuit comprises a pair of alternately conducting controlled switches for each pair of stator windings, said controlled switches being solid state controlled devices, said three opposing pairs of concentrated stator windings have a winding pitch of about 120° and each stator winding overlaps the adjacent stator windings by about 60°, and said rotor pole faces have a circumferential length of about 120°, whereby the brushless motor is suitable for stepped voltage wave shape energization.

3. A compatible brushless motor and motor control circuit comprising an annular stator member supporting a plurality of opposing pairs of concentrated stator windings for generating magnetic fields of opposite polarity in torque producing relation to a rotatable ferromagnetic rotor, said stator member and rotor each having opposing arcuate pole faces to establish an approximately constant gap width therebetween, a motor control circuit comprising only a few controlled switches for applying simple substantially rectilinear wave shape energizing voltages of both polarities to said pairs of stator windings, the winding pitch and location relative to one another of said concentrated stator windings, and the circumferential length of said rotor pole faces, having interdependent angular dimensions to produce substantially rectilinear back emf voltages in each pair of stator windings that have approximately the same wave shape as the energizing voltage applied by said motor control circuit, and control means responsive to the instantaneous position of said rotor for rendering conductive said controlled switches for desired intervals of conduction to energize said pairs of stator windings in a sequence to produce continuous torque to rotate said rotor in a given direction, wherein there are only three opposing pairs of series connected concentrated stator windings, said motor control circuit comprises a pair of alternately conducting controlled switches for each pair of stator windings, said controlled switches being solid state controlled devices, said three opposing pairs of concentrated stator windings are non-overlapping windings each having a winding pitch of about 60°, and said rotor pole faces have a circumferential length of about 120°, whereby the brushless motor is suitable for quasi-square voltage wave shape energization.

4. A compatible brushless motor and motor control circuit comprising an annular stator member supporting a plurality of opposing pairs of concentrated stator windings for generating magnetic fields of opposite polarity in torque producing relation to a rotatable ferromagnetic rotor, said stator member and rotor each having opposing arcuate pole faces to establish an approximately constant gap width therebetween, a motor control circuit comprising only a few controlled switches for applying simple substantially rectilinear wave shape energizing voltages of both polarities to said pairs of stator windings, the winding pitch and location relative to one another of said concentrated stator windings, and the circumferential length of said rotor pole faces, having interdependent angular dimensions to produce substantially rectilinear back emf voltages in each pair of stator windings that have approximately the same wave shape as the energizing voltage applied by said motor control circuit, and control means responsive to the instantaneous position of said rotor for rendering conductive said controlled switches for desired intervals of conduction to energize said pairs of stator windings in a sequence to produce continuous torque to rotate said rotor in a given direction, wherein there are only three opposing pairs of series connected concentrated stator windings, said motor control circuit comprises a pair of alternately conducting controlled switches for each pair of stator windings, said controlled switches being solid state controlled devices, said three opposing pairs of concentrated stator windings have a winding pitch of about 120° and each stator winding overlaps the adjacent stator windings by about 60°, and said rotor pole faces have a circumferential length of about 60°, whereby the brushless motor is suitable for quasi-square voltage wave shape energization.

5. A brushless motor suitable for energization by simple substantially rectilinear voltage wave shapes comprising an annular stator member supporting a plurality of opposing pairs of series connected concentrated stator windings for generating magnetic fields of opposite polarity in torque producing relation to a ferromagnetic rotor mounted for rotation within said stator member, said stator member and rotor each having opposing arcuate pole faces to establish an approximately constant gap width therebetween, the winding pitch and location relative to one another of said concentrated stator windings, and the circumferential length of said rotor pole faces, having interdependent angular dimensions to produce simple substantially rectilinear back emf voltages in each pair of stator windings that have approximately the same wave shape as the energizing rectilinear voltage wave shapes, wherein there are three opposing pairs of concentrated stator windings each having a winding pitch of about 90° and each stator winding overlaps the adjacent stator windings by about 30°, and said rotor pole faces have a circumferential length of about 90°, whereby the brushless motor is suitable for square voltage wave shape energization.

6. A brushless motor suitable for energization by simple substantially rectilinear voltage wave shapes comprising an annular stator member supporting a plurality of opposing pairs of series connected concentrated stator windings for generating magnetic fields of opposite polarity in torque producing relation to a ferromagnetic rotor mounted for rotation within said stator member, said stator member and rotor each having opposing arcuate pole faces to establish an approximately constant gap width therebetween, the winding pitch and location relative to one another of said concentrated stator windings, and the circumferential length of said rotor pole faces, having interdependent angular dimensions to produce simple substantially rectilinear back emf voltages in each pair of stator windings that have approximately the same wave shape as the energizing rectilinear voltage wave shapes, wherein there are three opposing pairs of concentrated stator windings each having a winding pitch of about 120° and each stator winding overlaps the adjacent stator windings by about 60°, and said rotor pole faces have a circumferential length of about 120°, whereby the brushless motor is suitable for stepped wave energization.

7. A brushless motor suitable for energization by simple substantially rectilinear voltage wave shapes comprising an annular stator member supporting a plurality of opposing pairs of series connected concentrated stator windings for generating magnetic fields of opposite polarity in torque producing relation to a ferromagnetic rotor mounted for rotation within said stator member, said stator member and rotor each having opposing arcuate pole faces to establish an approximately constant gap width therebetween, the winding pitch and location relative to one another of said concentrated stator windings, and the circumferential length of said rotor pole faces, having interdependent angular dimensions to produce simple substantially rectilinear back emf voltages in each pair of stator windings that have approximately the same wave shape as the energizing rectilinear voltage wave shapes, wherein there are three non-overlapping opposing pairs of concentrated stator windings each having a winding pitch of about 60°, and said rotor pole faces have a circumferential length of about 120°, whereby the brushless motor is suitable for quasi-square wave shape energization.

8. A brushless motor suitable for energization by simple substantially rectilinear voltage wave shapes comprising an annular stator member supporting a plurality of opposing pairs of series connected concentrated stator windings for generating magnetic fields of opposite polarity in torque producing relation to a ferromagnetic rotor mounted for rotation within said stator member, said stator member and rotor each having opposing arcuate pole faces to establish an approximately constant gap width therebetween, the winding pitch and location relative to one another of said concentrated stator windings, and the circumferential length of said rotor pole faces, having interdependent angular dimensions to produce simple substantially rectilinear back emf voltages in each pair of stator windings that have approximately the same wave shape as the energizing rectilinear voltage wave shapes, wherein there are three opposing pairs of concentrated stator windings each having a winding pitch of about 120° and each stator winding overlaps the adjacent stator windings by about 60°, and said rotor pole faces have a circumferential length of about 60°, whereby the brushless motor is suitable for quasi-square wave shape energization.

9. A compatible brushless motor and motor control circuit comprising an annular stator member supporting a plurality of symmetrically arranged opposing pairs of concentrated stator windings each simultaneously generating magnetic fields of opposite polarity in torque producing relation to a rotatable ferromagnetic rotor, said stator member and rotor having opposing arcuate pole faces to establish an approximately constant gap width therebetween, a motor control circuit comprising only a few controlled switches for applying simple substantially rectilinear stepped wave shape energizing voltages of both polarities to said pairs of stator windings, wherein the sum of the angular dimensions of the winding pitch of said concentrated stator windings and the circumferential length of one of said rotor pole faces totals approximately 240° and produces substantially rectilinear back emf voltages in each pair of stator windings that have approximately the same wave shape as the energizing voltage applied by said motor control circuit, and control means responsive to the instantaneous position of said rotor for rendering conductive said controlled switches for desired intervals of conduction to energize said pairs of stator windings in a sequence to produce continuous torque to rotate said rotor in a given direction.

* * * * *